J. R. CROSS,
Assignor to H. H. Doubleday.
PACKING FOR OIL-WELLS.
No. 7,902. Reissued Oct. 2, 1877.
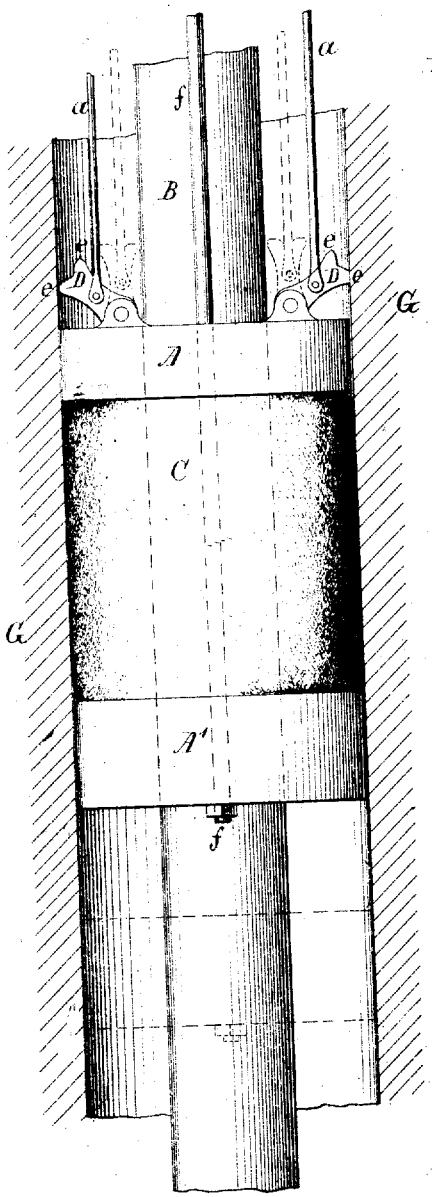
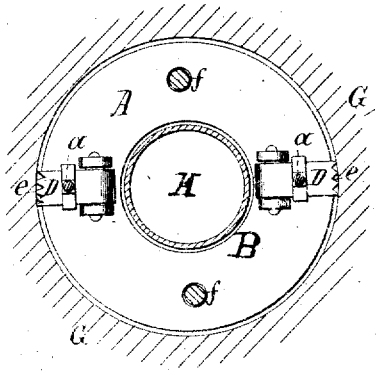
Attest:
Henry Orth
H. H. Bliss
Inventor:
John R. Cross.
for H. H. Doubleday
Atty.

UNITED STATES PATENT OFFICE

JOHN R. CROSS, OF CLEVELAND, OHIO, ASSIGNOR TO HENRY H. DOUBLEDAY, OF WASHINGTON, DISTRICT OF COLUMBIA.

IMPROVEMENT IN PACKING FOR OIL-WELLS.

Specification forming part of Letters Patent No. 50,910, dated November 14, 1865; Reissue No. 7,902, dated October 2, 1877; application filed September 17, 1877.

*To all whom it may concern:*

Be it known that I, JOHN R. CROSS, of Cleveland, in the county of Cuyahoga and State of Ohio, have invented certain new and useful Improvements in Packing for Oil-Wells; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a side elevation of my improved packer, represented in the shaft of a well, (shown in sections.) Fig. 2 is a horizontal view of the same from above.

One object of my invention is to furnish a packing that will be as secure as the ordinary seed-bag, and possess the advantage of being adjustable to different positions in the well without reference to the position of the tubing.

My invention includes the combining, with a ring or flange, against which an elastic or yielding packing material is pressed, locking dogs or spurs adapted to engage with the wall of the well, to support such flange or ring against the thrust or pressure which is required to compress the packing material and force it (such material) against the wall of the well.

As represented in the drawings, my packing consists of two annular pieces, A A′, which may be made of cast-iron or other suitable material, which surround the tube B of the well, and are so loose thereon that they easily slide over the thimble-couplings of the pipe-sections when raised or lowered. These annular pieces are connected by strands or fibers of hemp or other suitable substance, C, which, when compressed between the rings A A′ with considerable force, will expand so as to press against the sides of both the tube and the well, and render the passage impervious to water.

The upper ring A is provided with two pawl-levers or dogs, D D, jointed at one end to the ring, near the tube, and the other free to be raised or lowered by wires *a a*, extending to the top of the well. These pawls or dogs are of such length that when their free ends rest against the sides of the well they are inclined upward at an angle; and these ends are hardened and provided with teeth *e e*, or otherwise made to engage with the sides of the well G G, and hold against a force applied from below them, and their arrangement is such that they act as a toggle-joint, and press more firmly against the sides as the power is increased.

The lower ring A′ is suspended by two strong rods or wire-ropes, *f f*, from the top of the well, where they are held by screw-nuts, or by levers or other appliances, by which they can be drawn in an upward direction.

In operating, the packing may be lowered around the pipe B, and, at the required point, may be instantly fixed in position by drawing upward on the suspension rods or wires *f f* by means of the action of the pawls D D on the ring A, as described; and when the ring is so fixed the fibrous packing C is compressed to the required tightness by the rods or ropes *f f*.

When it is desired to loosen the packing, it is done by simply letting down the rods or ropes *f f*, when the weight of the lower ring draws the ring by means of the fibers C, and thereby the pawls are released.

The lower ring is preferably made of considerable length, in order that its weight may act to relieve the upper ring, so that the whole may be lowered without exerting any pushing force on rods *f f*. As length is not objectionable, the ring A′ may be elongated into a tube of as many feet or yards as may be required.

It is readily perceived that the pawls D D might act upon the pipe B in the same manner as on the well, if it were provided at intervals with bands or projections against which they would hold without slipping, and thus accomplish the same result.

The wires *a a* are used to elevate the pawls, so that they will not take effect when it is required to raise the apparatus.

Where oil-wells have ceased to produce, it is customary to withdraw the tubes and leave the well open, by which water is allowed to enter, which is a cause of vast injury to other wells in the vicinity, as the influx of one well often forces away the oil from others. To prevent this the abandoned wells should be plugged below the veins of water, at a point which is often several hundred feet down. No adequate means has heretofore existed for plugging Artesian wells without tubes at such depths. A simple modification of my packing renders it equally effective when the tube is removed, and of great value to producing-wells in the neighborhood of those abandoned.

I cut off the pipe B a little above and below the packer, and screw a plug, H, Fig. 2, into the top, by which no water can pass through it. It is held after the tube is withdrawn, as before, by the suspension of rods *f f*, and they, by them, may be raised or lowered, to insure the cutting off of the lowest vein of water.

By making solid disks in place of the upper and lower rings A A′, and employing fibers enough to fill the entire area of the well, the same result is accomplished without retaining a portion of the tube.

When the solid disks are employed, the upper disk A may be enlogated, or have weights placed upon it, to produce the necessary compression; and by attaching to the center of said disk a rod, and extending it to the top of the well, the use of pawls D D may be dispensed with.

What I claim is—

1. In an oil-well packer, locking dogs or spurs adapted to engage with the wall of the well, and sustain the pressure employed to force the packing material against the wall.

2. In an oil-well packer, the combination, with dogs which engage with the wall of the well, of devices, substantially as described, whereby said dogs may be withdrawn from close contact with the wall when it is desired to move the packer upward in the well.

3. In an oil-well packer, locking dogs or spurs provided with sharp edges or teeth, adapted to enter or engage with the wall of the well, and resist the pressure employed to press the packing material against the sides of the well.

In testimony that I claim the foregoing I have hereunto set my hand this 31st day of August, 1877.

JOHN R. CROSS.

Witnesses:
F. TOUMEY,
W. E. DONNELLY.